(12) United States Patent
Hoashi et al.

(10) Patent No.: US 7,306,820 B2
(45) Date of Patent: Dec. 11, 2007

(54) METHOD FOR THAWING FROZEN GROUND FISH MEAT

(75) Inventors: Masahito Hoashi, Tokyo (JP); Hisashi Nozaki, Saitama (JP); Kikuo Tashima, Kanagawa (JP); Yuji Sakayori, Kanagawa (JP)

(73) Assignee: Kabushiki Kaisha Kibun Shokuhin, Tokyo (JP)

( * ) Notice: Subject to any disclaimer, the term of this patent is extended or adjusted under 35 U.S.C. 154(b) by 0 days.

(21) Appl. No.: 09/000,366

(22) PCT Filed: Jul. 26, 1996

(86) PCT No.: PCT/JP96/02113

§ 371 (c)(1),
(2), (4) Date: Jan. 28, 1998

(87) PCT Pub. No.: WO97/04671

PCT Pub. Date: Feb. 13, 1997

(65) Prior Publication Data

US 2002/0037345 A1    Mar. 28, 2002

(30) Foreign Application Priority Data

Jul. 28, 1995  (JP) .................................... 7-211360
Jul. 28, 1995  (JP) .................................... 7-211361
Jul. 28, 1995  (JP) .................................... 7-211362

(51) Int. Cl.
A22C 25/20  (2006.01)

(52) U.S. Cl. ...................... 426/643; 426/646; 426/513; 426/518; 426/519; 426/520; 426/523; 426/524

(58) Field of Classification Search ............... 426/643, 426/646, 513, 518, 519, 520, 524
See application file for complete search history.

(56) References Cited

U.S. PATENT DOCUMENTS

| 3,607,315 | A | * | 9/1971 | Partyka | ....................... 99/195 |
| 4,687,672 | A | * | 8/1987 | Vitkovsky | ................... 426/524 |
| 4,906,486 | A | * | 3/1990 | Young | ......................... 426/518 |
| 4,950,494 | A | * | 8/1990 | Katoh et al. | ................ 426/513 |
| 5,080,922 | A | * | 1/1992 | Hosokawa | .................. 426/646 |
| 6,096,367 | A | * | 8/2000 | Hoashi et al. | .............. 426/643 |

FOREIGN PATENT DOCUMENTS

AU         9530402 A  *  3/1996

(Continued)

*Primary Examiner*—Drew Becker
(74) *Attorney, Agent, or Firm*—Browdy and Neimark, PLLC

(57) ABSTRACT

Disclosure is made of a method for thawing frozen ground fish meats which comprises almost uniformly milling a frozen ground fish meat mass and then thawing it by elevating temperature. Disclosure is further made of a process for producing materials for fish paste products which involves the step of mixing under stirring the ground fish meat thus thawed together with additives with the use of a pin mixer. Disclosure is furthermore made of a process for producing kamaboko which comprises molding the material for fish paste products thus obtained, passing electric current therethrough, thus heating the molded products due to the electrical resistance within the same, subjecting the products to suwari gelation by heating for a definite time and then further heating the same. The method of the present invention is widely usable in the industrial fields with the use of frozen ground fish meats.

16 Claims, 1 Drawing Sheet

FOREIGN PATENT DOCUMENTS

| | | | |
|---|---|---|---|
| CA | 1213170 | * | 10/1986 |
| CA | 1213170 A | * | 10/1986 |
| JP | 53-34958 | | 3/1978 |
| JP | 5334958 | | 3/1978 |
| JP | 58-152468 | | 9/1983 |
| JP | 6070049 | | 4/1985 |
| JP | 2-253860 | | 10/1990 |
| JP | 2253860 | | 10/1990 |
| JP | 6133739 | | 5/1994 |
| WO | WO 97/04670 A1 | * | 2/1997 |

* cited by examiner

METHOD FOR THAWING FROZEN GROUND FISH MEAT

TECHNICAL FIELD

This invention relates to a method for thawing frozen ground fish meats (frozen surimi) employed as materials for producing fish paste products; and a process for producing fish paste products and kamaboko (a boiled fish paste product) with the use of this method.

BACKGROUND ART

In general, fish paste products are produced by adding sodium chloride to ground fish meat, mixing it with stirring (so-called "shio-zuri"), adding seasonings, starch, water, etc. thereto, molding the resulting mixture and then elevating the temperature. The ground fish meats employed as the starting materials are usually stored and transported in a frozen state and widely utilized as materials for producing various food products.

Fishes processed into ground fish meats are exemplified by croaker (*Nibea mitsukuri*), swordfish (*Makaira mazara*), sand borer (*Argentina semifasciatus* KISHINOUE), lizardfish (*Saurida undosquamis*), warazuka (*Stichaeus grigorjewi* HERZENSTEIN) and Alaska pollack (*Theragra chalcogramma*). In recent years, Alaska pollack, etc. have been mainly employed therefor because of the decrease in the trawl fishery catch. However, pollacks are liable to be denatured in meat qualities during the freezing step. Thus, it has been a practice to add about 5% of sugar to frozen ground fish meat for preventing the denaturation and, at the same time, to thoroughly leach the ground fish meat with water so as to eliminate water-soluble enzyme proteins and salts, which participate in the denaturation during freezing, therefrom.

Frozen ground fish meat is produced via the following steps. First, the fishes are washed. After removing the heads and internals, the fishes are washed again and the meat is collected therefrom. The fish meat thus collected is next leached with 4 to 5 times as much water so that water-soluble proteins and salts are eliminated therefrom as far as possible. Subsequently, the fish meat is pressed, dehydrated and strained. After adding 5 to 10% of sugar and 0.2% of polyphosphates, the obtained blend is well mixed. 10 kg of this mixture is packed in a polyethylene film and rapidly frozen at about −35° C. with the use of a contact freezer to thereby give frozen ground fish meat. The frozen ground fish meat is stored usually at −15 to −25° C.

To produce fish paste products with the use of the frozen ground fish meat thus obtained, the frozen ground fish meat should be thawed and then subjected to shio-zuri. Known methods for thawing include spontaneous thawing, high frequency thawing, pressurized thawing in the presence of salt, etc. However, the frozen ground fish meat is in the form of a frozen pan weighing 10 kg and thus cannot be easily thawed. Thus, it is unavoidable that the frozen ground fish meat is thawed unevenly even though a thawing apparatus is employed, which brings about a problem that the ground fish meat sensitive to temperature is partly deteriorated in the qualities. Such deterioration worsens and, in its turn, makes unstable the qualities of the fish paste products.

DISCLOSURE OF THE INVENTION

An object of the present invention is to provide a method by which a frozen ground fish meat can be rapidly thawed while maintaining its ability to gel at the maximum level without causing any deterioration in the qualities thereof. Another object of the present invention is to provide a process for producing materials for fish paste products which comprises mixing under stirring the ground fish meat thus thawed with additives while maintaining its ability to gel at the maximum level. Another object of the present invention is to provide a process for producing a kamaboko product having high gel strength and excellent molding properties. Other objects of the present invention will be understood from the following description and the technical level at the filing date of the application.

These objects of the present invention have been achieved by providing the present invention as will be described hereinbelow.

The present invention provides a method for thawing frozen ground fish meats which comprises almost uniformly milling a frozen ground fish meat mass and then elevating temperature.

The present invention further provides a process for producing materials for fish paste products which comprises mixing under stirring the ground fish meat thus thawed with additives by using a pin mixer.

The present invention furthermore provides a process for producing a kamaboko product which comprises molding the material for fish paste products thus produced, passing electric current through the ground fish meat, thus heating it due to the electrical resistance within the ground fish meat, subjecting it to suwari gelation by heating for a definite period of time and then further heating it.

BEST MODE FOR CARRYING OUT THE INVENTION

Figure 1:
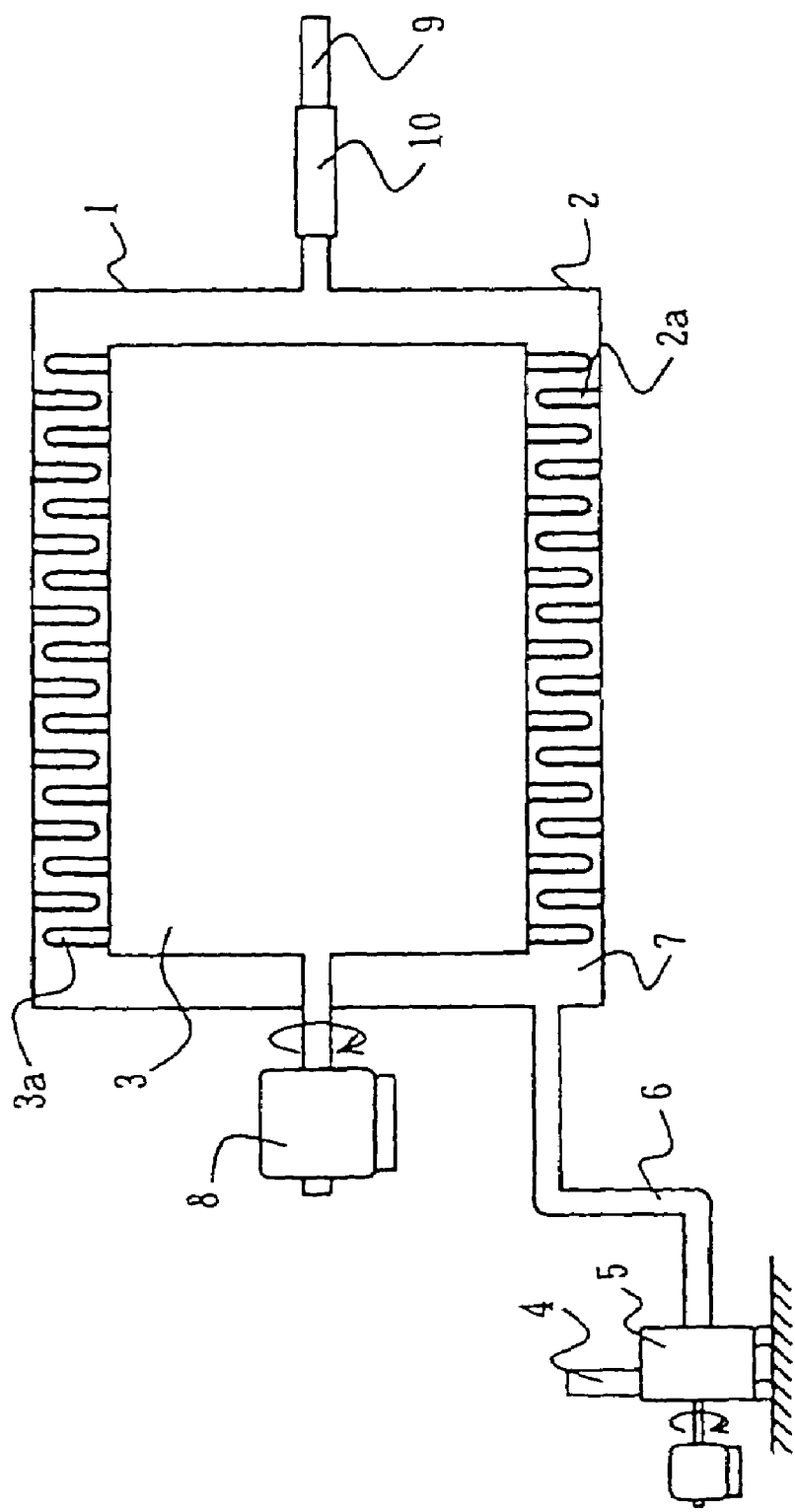
FIG. 1 shows an example of the structure of a pin mixer employed in the present invention.

The method for thawing frozen ground fish meat of the present invention consists of the step of almost uniformly milling a frozen ground fish meat mass and the subsequent step of thawing the frozen ground fish meat thus milled by elevating temperature.

The frozen ground fish meat to be used in the present invention is not particularly restricted in type. In the present invention, namely, use can be made of frozen ground fish meats of various types without any limitation in fish type, composition, freezing conditions, weight, shape, storage time, etc. In general, frozen ground fish meat masses are distributed in kg units for the sake of convenience in storage and handling. For example, 10 kg of a frozen ground fish meat is supplied in the form of a mass of about 40×30×5 cm in size. The method of the present invention is widely usable in thawing these usual frozen ground fish meat masses.

In the thawing method of the present invention, such a frozen ground fish meat mass is first milled to pieces of such a size as being thawed almost uniformly as the whole. It is preferable to mill the mass into pieces of 20 mm or less in size. This is because, after spontaneously thawing at around room temperature, the qualities are scarcely different between the surface and core in such a case. It is still preferable to mill the mass into pieces of about 10 to 3 mm in size, since these pieces can be spontaneously thawed within a short period of time. When thawed by force under, for example, a hot-air stream or radiation with heating coils, these pieces scarcely show any difference in qualities between the surface and core. The milling can be performed either in a single step or in two or more steps so that the desired size can be achieved. When the milling is performed in two or more steps, it is preferable that the ground fish meat is milled in two steps, i.e., the first step of roughly crushing and the second step of finely milling.

The crushing and milling are performed at such a temperature as not causing any change in the qualities of the frozen ground fish meat mass during the operation. In usual, it is preferable to crush and mill the frozen ground fish meat mass at 10° C. or below, since the qualities of the ground fish meat are scarcely changed at such a temperature and thus no partial thawing, which brings about changes in the qualities, occurs on the surface of the frozen ground fish meat during the operation. When changes in the qualities can be effectively prevented by, for example, carrying out the operation quickly, however, the crushing and milling may be performed at room temperature.

The frozen ground fish meat can be crushed and milled with the use of apparatuses appropriately selected from among various ones capable of grinding frozen products. When the frozen ground fish meat mass is milled in two or more steps, either a single apparatus or different ones may be used in these steps. When different apparatuses are employed, it is possible, for example, that the frozen ground fish meat is roughly crushed with a born cutter (for example, MK Born Cutter manufactured by Masuko Sangyo K.K.) or a frozen cutter (for example, the one manufactured by Shonan Sangyo K.K.) and then finely milled with a chopper (for example, MK Chopper manufactured by Masuko Sangyo K.K.) to give almost uniform fine particles. When a single apparatus is employed, it is possible, for example, that the ground fish meat is finely and directly milled with a flaker grinder (manufactured by Nippon Carrier K.K.) into small pieces with uniform size.

The frozen ground fish meat thus almost uniformly milled is then thawed by elevating temperature. The temperature may be elevated by using a heating means commonly employed in the art or by allowing to stand the milled ground fish meat at room temperature. In this step, it is preferable that the temperature is elevated while uniformly spreading the frozen ground fish meat milled above so that the milled pieces do not unevenly overlap one another. Also, it is preferable to elevate the temperature while mixing the frozen ground fish meat pieces with a stirring means such as a mixer to thereby make the temperature distribution uniform. Thus, the frozen ground fish meat can be uniformly heated and, in its turn, uniformly and quickly thawed. In this case, the heating and thawing can be carried out almost uniformly, even though the frozen ground fish meat particles are somewhat uneven in size.

According to the thawing method of the present invention, the frozen ground fish meat, which has been already milled, can be quickly and almost uniformly thawed. Thus, it is possible to avoid the typical trouble encountering in the prior art that the frozen ground fish meat is completely thawed in the surface but still frozen at the core. That is to say, the present invention makes it possible to minimize the deterioration in the qualities and the ability to gel of the ground fish meat accompanying thawing. Accordingly, the ground fish meats thawed by the method of the present invention are usable as preferable materials for producing various products including fish paste products.

When a mixer is employed in the step of elevating temperature and thawing, sodium chloride, seasonings, starch, water, etc. may be added to the ground fish meat during or after thawing. These additives may be supplied with the use of an automatic dosing feeder, an automatic liquid feeder, an automatic powder feeder, etc. The additives are mixed within a short period of time by the mixer. After thawing, the mixture is in the form of a paste and a lower temperature thereof is the more desirable. The temperature preferably falls within the range of from 0 to 10° C., still preferably from 0 to 5° C.

In usual, sodium chloride is put on the ground fish meat thus thawed and then the mixture is stirred (shio-zuri) and further processed to thereby give the final products. It has been a practice to use various apparatuses such as an attritor (bachi), a cutting mixer or a mixer-type cutter in this shio-zuri step. However, these apparatuses are all batch-type ones. Therefore, it takes a long time of 15 to 60 minutes to complete the treatment therewith. Accordingly, these conventional shio-zuri methods suffer from a problem that the fish meat proteins are changed during this step and undergo gelation characteristic to fish paste products, thus deteriorating the ability to gel.

To cope with this situation, it is preferable that the ground fish meat thawed by the method of the present invention is subjected to shio-zuri with the use of a pin mixer. The term "pin mixer" as used herein means a stirring mixer having a drum provided with a plural number of projections at the outer periphery thereof and a coaxial cylinder covering the outer periphery of the drum at a definite interval and provided with a plural number of projections located at the inner periphery thereof and the drum or cylinder being rotated so that the feedstock is sheared between these projections. FIG. 1 is a diagram illustrating an example of the structure of the pin mixer. As FIG. 1 shows, the pin mixer 1 consists of a fixed cylinder 2 and a rotary drum 3. The cylinder has a plural number of projections 2a at the inner periphery thereof, while the drum has a plural number of projections 3a at the outer periphery thereof. The cylinder projections 2a and the drum projections 3a are alternately arranged so as to not come in contact with each other during rotation.

After adding sodium chloride, etc., the ground fish meat is supplied into the mixing head 7 of the pin mixer 1 by the carrying pump 5 via the pump inlet 4 and the pipe 6. During the operation, the drum 3 of the pin mixer 1 is rotated at a definite speed by the motor 8. The material fed into the mixing head 7 is effectively sheared between the projections of the cylinder and those of the drum. During the passage through the pin mixer, the material is cut into very fine pieces and, at the same time, uniformly dispersed and mixed. The material in the mixing head is usually pressurized by the carrying pump 5. Owing to this pressure, the material transfers from the mixing head to the extrusion port 9 and discharged therefrom in a definite dosage under the regulation by the extrusion control valve 10.

The procedure of shio-zuri with the use of a pin mixer is described in JP, 3-41145, B cited herein by way of reference. By using a pin mixer in the shio-zuri step, it is therefore possible to fully utilize the largest advantage of fish meat and obtain products with sufficient gelation without resort to any skill or experience. That is to say, use of a pin mixer in the shio-zuri step makes it possible to fully utilize the ability to gel of the frozen ground fish meat and industrially manufacture products with sufficient gelation comparable to those produced under strict control.

After the completion of shio-zuri, the ground fish meat is widely usable as a material for producing various fish paste products.

For example, it may be molded and heated in a conventional manner to thereby give kamaboko. In this process, shape retention is needed to mold the ground fish meat into kamaboko. However, the ground fish meat, which has been subjected to shio-zuri at a low temperature so as to fully sustain its ability to gel, is highly flowable and thus cannot sustain its shape merely by molding. In the case of products with a high rise such as Odawara kamaboko, the molded products are liable to be deformed and thus lost the commercial value. To solve this problem, attempts have been made to lower the flowability of the ground fish meat by adding calcium salts such as calcium carbonate and calcium chloride which promote the gelation of the ground fish meat. In this method, however, the kamaboko gel is sometimes hardened and thus the qualities thereof are damaged.

To cope with this situation, it is preferable to pass electric current through the ground fish meat and heat it due to the electrical resistance within the same (i.e., so-called Joule heating). Next, the ground fish meat is subjected to suwari gelation by heating for a definite period of time and then heated again. Owing to this Joule heating, the ground fish meat is rapidly heated to a desirable temperature (for example, from 25 to 40° C.) and thus sufficient shape retention can be imparted thereto prior to suwari gelation. In the usual suwari gelation step without resort to Joule heating, the molded kamaboko products are merely heated in an atmosphere of 25 to 40° C. During the slow elevation of temperature, therefore, the molded products become flowable and thus undergo deformation or the suwari gelation effect varies from product to product. In the case of the Joule heating, in contrast thereto, these problems never occur, since the kamaboko products are heated to a definite temperature within a short period of time. In the subsequent suwari gelation step, the Joule heating may be further continued so as to maintain the definite temperature. Alternatively, the products may be transferred into a thermostat room, etc. maintained at the same temperature.

After the completion of the suwari gelation, the products are heated to 75 to 85° C. by the conventional steaming method or Joule heating to thereby allow further gelation. It is preferable that Joule heating is employed in this heating step too, since the products are internally heated thereby and thus quickly pass through the reversion temperature zone, thus giving highly elastic kamaboko products. As discussed above, the rapid elevation of temperature by the Joule heating makes it possible to easily produce kamaboko products which are excellent in shape and gel properties and have high elasticity.

To further illustrate the present invention in greater detail, and not by way of limitation, the following Examples will be given.

EXAMPLE 1

10 kg of frozen ground Alaska pollack meat (SA grade) was cut into flakes of about 20 mm by using a bone cutter (manufactured by Masuko Sangyo K.K.) and then further milled into granules of 7 mm in size with a chopper (manufactured by Masuko Sangyo K.K.). The granulate frozen ground Alaska pollack meat was spread uniformly in a vat and spontaneously thawed by allowing to stand at room temperature (20 to 25° C.) while occasionally stirring it to thereby achieve uniform temperature distribution. It took 20 to 30 minutes to complete this spontaneous thawing.

For comparison, 10 kg of the same frozen ground Alaska pollack meat (SA grade) was thawed by allowing to stand at room temperature (20 to 25° C.) as such, i.e., in the form of the frozen pan without cutting. In this case, it took 6 to 8 hours to complete the spontaneous thawing.

To each ground fish meat thus thawed was added 30 g/kg of sodium chloride. After adding sodium chloride in a cutting mixer in a conventional manner, the obtained blend was mixed under stirring. Then starch, seasonings, water, etc. were further added thereto followed by mixing and stirring (shio-zuri). Next, the ground fish meat was divided into two portions. One portion was packed in a casing of 45 mm in diameter, subjected to suwari gelation in hot water (35° C.) for 40 minutes and then heated to 80° C. for 30 minutes. Another portion was directly heated to 80° C. for 30 minutes.

These fish paste products thus obtained were subjected to a gel test by casing. The casing kamaboko products were sliced into pieces of 13 mm in thickness and conditioned by allowing to stand at 20 to 25° C. while preventing them from drying. Then the gel strength of each sample was measured with a rheometer (manufactured by Iio Denki K.K.). Table 1 shows the results.

TABLE 1

|  | Gel strength in suwari casing (g) | Gel strength in direct heating (g) |
|---|---|---|
| Invention | 1,500-1,600 | 650-700 |
| Comparison | 1,300-1,400 | 450-500 |

EXAMPLE 2

10 kg of frozen ground Alaska pollack meat (SA grade) was cut into chips at about −15° C. by using a frozen cutter (manufactured by Shonan Sangyo K.K.) and then further milled into granules of 5 mm in size with an MK chopper (manufactured by Masuko Sangyo K.K.). The granulate frozen ground Alaska pollack meat was fed into an MK mixer (manufactured by Masuko Sangyo K.K.) and heated and thawed therein under stirring. When the temperature of the ground fish meat reached −3 to 0° C., a mixture comprising 3 parts of sodium chloride, 5 parts of starch, 3 parts of mirin (sweetened sake seasoning), 1 part of sodium glutamate, 3 parts of a fish-extract seasoning and 60 parts of water, each per 100 parts of the ground fish meat, was automatically poured thereinto. The resulting mixture was mixed in the MK mixer. After the completion of the mixing, the mixture was transferred into a pin mixer via a carrying pump involved in the MK mixer. The mixture was treated under regulating the rotation speed of the pin mixer to 300 rpm and setting the transfer speed so as to give a stirring time (i.e., from feeding to discharging) of 7 minutes. Next, the ground fish meat thus obtained was molded into kamaboko products which were quickly heated to 35° C. and subjected to suwari gelation for 40 minutes. Subsequently, the products were steamed at 85° C. for 40 minutes. The kamaboko products thus obtained were smooth and highly viscoelastic. They showed gel strength of 950 to 1,000 g.

For comparison, 10 kg of the same frozen ground Alaska pollack meat (SA grade) was thawed by using a thawing machine under pressurizing/heating at 40° C. for 10 minutes and the obtained product was examined by the above-mentioned method. Namely, the same composition as the one described above was stirred with a silent cutter in a conventional manner and then molded into kamaboko products. After subjecting to suwari gelation at 35° C. for 40 minutes and steaming at 85° C. for 40 minutes, the obtained kamaboko products had gel strength of 750 to 800 g, showing an evident difference from the above-mentioned kamaboko products of the present invention.

EXAMPLE 3

10 kg of frozen ground Alaska pollack meat (SA grade) was cut into chips at about −15° C. by using a frozen cutter (manufactured by Shonan Sangyo K.K.) and then further milled into granules of 5 mm in size with an MK chopper (manufactured by Masuko Sangyo K.K.). The granulate frozen ground Alaska pollack meat was fed into an MK mixer (manufactured by Masuko Sangyo K.K.) and heated and thawed therein under stirring. When the temperature of the ground fish meat reached −3 to 0° C., a mixture comprising 3 parts of sodium chloride, 5 parts of starch, 3 parts of mirin, 1 part of sodium glutamate, 3 parts of a fish-extract seasoning and 60 parts of water, each per 100 parts of the ground fish meat, was automatically poured thereinto. The resulting mixture was mixed in the MK mixer. After the completion of the mixing, the mixture was transferred into a pin mixer via a carrying pump involved in the MK mixer. The mixture was treated under regulating the rotation speed of the pin mixer to 300 rpm and setting the transfer speed so as to give a stirring time (i.e., from feeding to discharging) of 7 minutes.

Next, the ground fish meat thus obtained was molded into kamaboko products and then subjected to suwari gelation by Joule heating (i.e., passing electric current therethrough between electrodes). Subsequently, the products were steamed at 85° C. for 40 minutes. The kamaboko products thus obtained were smooth and highly viscoelastic. They showed gel strength of 950 to 1,000 g. Because of having been Joule-heated quickly to 35° C., the products underwent no sagging during the suwari gelation time and had a good shape and high gel strength.

Kamaboko products were produced by performing the same suwari gelation procedure as the one described above but continuing the Joule heating at 85° C. for additional 10 minutes as a substitute for the above-mentioned steaming. Compared with kamaboko products produced by the conventional steam-heating method, the thus obtained products were more elastic and had gel strength of 1,000 to 1,100 g.

For comparison, the same ground Alaska pollack meat having been subjected to shio-zuri was molded into kamaboko products and then subjected to suwari gelation by steaming at 35° C. for 40 minutes followed by further heating to 85° C. for 40 minutes. Since the ground fish meat was molded at a low temperature and then the suwari gelation was performed, sufficient effect of the suwari gelation could not be achieved. Thus, these products underwent sagging and became flat. Moreover, they had much lower gel strength of 850 to 900 g than the kamaboko products obtained by Joule heating.

INDUSTRIAL APPLICABILITY

According to the method for thawing frozen ground fish meats of the present invention, a frozen ground fish meat can be quickly thawed while maintaining its ability to gel at the maximum level without causing any deterioration in the qualities thereof. The process for producing materials for fish paste products of the present invention makes it possible to supply materials sustaining the ability to gel at the maximum level. Moreover, the process for producing kamaboko of the present invention makes it possible to supply kamaboko products having high gel strength and excellent molding properties. Accordingly, the present invention is widely usable in the industrial fields with the use of frozen ground fish meats and applicable over an extremely broad range.

The invention claimed is:

1. A method for thawing frozen ground fish meat mass which comprises cutting a frozen ground fish meat mass into flakes or chips and milling the flakes or chips into granules having a uniform particle size in the absence of partial thawing at −15° C. or below, and then thawing without shearing the granules by elevating the temperature.

2. The thawing method as claimed in claim 1, wherein said frozen ground fish meat mass is crushed after being cut into flakes or chips and then is milled into granules.

3. The thawing method as claimed in claim 1, wherein after said frozen ground fish meat mass is cut into flakes or chips, the flakes or chips are milled into of 20 mm or less in size.

4. The thawing method as claim in claim 3, wherein after said frozen ground fish meat mass is cut into flakes or chips, the flakes or chips are milled into granules of 3 to 10 mm in size.

5. The thawing method as claimed in claim 1, wherein the granules thawed by elevating the temperature without mashing.

6. The thawing method as claimed in claim 2, wherein the granules thawed by elevating the temperature without mashing.

7. The thawing method as claimed in claim 3, wherein the granules are thawed by elevating the temperature without mashing.

8. The thawing method as claimed in claim 4, wherein the granules are thawed by elevating the temperature without mashing.

9. The method according to claim 1, wherein said granules of substantially uniform size are thawed in the absence of additives.

10. The method according to claim 1, wherein the frozen ground fish meat mass has a weight of 10 kg.

11. The method according to claim 1, wherein the frozen ground fish meat mass has a side of 5 cm in length or more.

12. The method for thawing frozen ground fish meat mass according to claim 1, comprising cutting the frozen ground fish meat mass into flakes of about 20 mm.

13. The method for thawing frozen ground fish meat mass according to claim 1, comprising milling the flakes or chips into granules of 5 to 7 mm in size.

14. A process for producing materials for fish paste products which involves she steps of cutting a frozen ground fish meat mass into flakes or chips and milling the flakes or chips into granules having a uniform particle size as −15 C. or below; thawing said granules without shearing the granules by elevating the temperature to give a thawed ground fish meat; and mixinq under stirring said thawed ground fish meat together with additives with the use of a pin mixer, wherein said additives include at least one of a seasoning, starch, sugar, and a polyphosphate.

15. A process for producing kamaboko which comprises:
molding a material for fish paste products, which material has been produced by cutting a frozen ground fish meat mass into flakes or chips and milling the flakes or chips into granules having a uniform particle size at −15° C. or below, thawing the granules by elevating the temperature to give a thawed ground fish meat, and mixing under stirring said thawed ground fish meat together with additives using a pin mixer to form a molded product,
passing electric current through the molded product, thus heating the molded product due to the electrical resistance within the molded product,
subjecting the molded product to suwari gelation by heating for a definite time, and
then further heating the molded product.

16. The process according to claim 14 wherein said granules of uniform size are thawed in the absence of additives.

* * * * *